United States Patent [19]
Blaschke et al.

[11] 3,890,186
[45] June 17, 1975

[54] METHOD OF BONDING USING A POLYESTER HOT-MELT ADHESIVE

[75] Inventors: Franz Blaschke, Witten-Annen; Arno Gardziella, Witten-Ruedinghausen; Gerhard Schade, Witten-Bommern, all of Germany

[73] Assignee: Dynamit Nobel AG, Troisdorf, Germany

[22] Filed: Nov. 2, 1972

[21] Appl. No.: 303,289

Related U.S. Application Data

[63] Continuation of Ser. No. 24,439, March 12, 1970, abandoned.

[30] Foreign Application Priority Data

Mar. 11, 1969 Germany.......................... 1912177

[52] U.S. Cl............................... 156/332; 260/40 R
[51] Int. Cl. ........................ C09j 5/00; B32b 27/20
[58] Field of Search................... 156/332; 260/40 R

[56] References Cited

UNITED STATES PATENTS

| | | | |
|---|---|---|---|
| 3,142,434 | 7/1964 | Chapman | 229/53 |
| 3,212,115 | 10/1965 | Crowell | 12/145 |
| 3,372,148 | 3/1968 | Wiener | 260/75 |
| 3,471,439 | 10/1969 | Bixler et al. | 260/41 |
| 3,484,339 | 12/1969 | Caldwell | 161/231 |
| 3,607,975 | 9/1971 | Tsukada et al. | 260/850 |
| 3,669,921 | 6/1972 | Droke et al. | 260/40 R |

*Primary Examiner*—Charles E. Van Horn
*Assistant Examiner*—Robert A. Dawson
*Attorney, Agent, or Firm*—Burgess, Dinklage & Sprung

[57] ABSTRACT

Improvements in the cementing of leather or other pieces together by using a melting adhesive of polyester, comprising terephthalic acid, with or without isophthalic acid, and one or more glycol, admixed with 0.01 to 0.3 weight percent of an inorganic powder with a grain size less than 5 microns.

8 Claims, No Drawings

METHOD OF BONDING USING A POLYESTER HOT-MELT ADHESIVE

This is a continuation of application Ser. No. 24,439, filed Mar. 12, 1970, and now abandoned.

This invention relates to adhesives. It more particularly refers to fast setting melting adhesives.

Thermoplastic adhesives are used for the cementing of materials such as paper, leather, wood, plastics, etc. The adhesives, which usually contain no solvents, are applied in the molten state. Such thermoplastic adhesives are referred to as melting adhesives.

The melting adhesives disclosed in French Pat. No. 1,174,679 and German Pat. No. 1,103,489 which are based on saturated polyesters are not, however, satisfactory in practice as regards their setting time. By setting time is meant the time period from the moment of application of the adhesive to the solid materials to be joined until the bond is solid.

Developments in the industry which manufactures machines for the application of melting adhesives have led to machines which operate with great efficiency and are designed to achieve a rapid operating cycle in coordination with an integrated larger overall manufacturing process.

An example of such an integrated larger manufacturing process is the manufacture of shoes. A number of cooperating and interrelated procedures are involved in the manufacture of a shoe. Within the overall process of shoe manufacture is to so-called "Spitzenwicken" of shoes, which is performed entirely automatically with thermoplastic melting adhesives on special "Spitzenwick" machines. In order to have a fast process it is necessary that the individual processing step, namely Spitzenwicken, fit well into the time schedule of the overall operations. Hitherto there have been no melting adhesives that set fast enough to permit the full utilization of the working capacity of these Spitzenwick machines.

Fast-setting melting adhesives are desired not only in shoe manufacture for the cementing of leather, but also in other manufacturing fields, e.g., in the packaging field for cementing paper, and in the furniture field for gluing veneer layers. It has been found that, in all cases, the limiting factor is achieving higher production rates is the setting time of the thermoplastic adhesives.

The subject of the present invention is the use, as melting adhesives, of polyesters having a melting point of 160° – 220°C, preferably 180° – 210°C, which are made by the reaction of terephthalic acid, along with isophthalic acid if desired, and one or more glycols having 2 to 10 carbon atoms, and contain 0.01 to 0.3%, preferably 0.05 to 0.1%, by weight, of an inert, inorganic powder having a grain size smaller than 5 microns.

In the case of co-polyesters of terephthalic and isophthalic acid, a molar ratio of 70:30 to 90:10 respectively, is used. Examples of the glycols are ethylene glycol, propylene glycol, butylene glycol, pentanediols, hexanediols, etc. Glycol mixtures, preferably those containing ethylene glycol, can be used.

Examples of suitable inert, inorganic powders are silica, titanium dioxide, zirconium oxide, aluminum oxide, talc, gypsum, fluorospar, kaolin, mica, barium sulfate, calcium carbonate, bentonite, mixtures thereof or the like, providing their grain size is smaller than 5 microns. The term inert, inorganic powders is considered to apply to those which do not enter into any reaction or cause any reaction with the polyester under the conditions of preparation and/or manufacture. The addition of these inorganic powders is performed preferably while the polyesters are being made.

German Green Pat. No. 1,190,984 describes the use of linear polyesters with the addition of 0.01 to 0.5% by weight of inorganic particles of a fineness up to 10 microns for the preparation of thin sheets. This patent, however, gives no suggestion with regard to the present invention, since in the manufacture of thin sheets different factors are involved than are involved in the use of a polyester of a certain composition as a melting adhesive. This invention is exemplified by the following Examples which are non-limiting.

EXAMPLE 1

An autoclave of stainless steel, equipped with a stirrer and a distillation apparatus that can be shut off, was charged with 18.94 kg of dimethyl terephthalate, 3.36 kg of dimethyl isophthalate, 21.8 kg of 1,4-butanediol, 1.2 g of zinc acetate dihydrate and 2.5 g of tetrabutyl titanate. After repeated flushing with nitrogen, the methanol was distilled away at atmospheric pressure at an internal temperature of about 180°–220°C; whereupon the temperature was raised to 250°C, and at that temperature a vacuum was applied. Within one hour, the internal temperature was then raised to 270°C and at the same time the pressure was reduced to below 1 Torr. After one hour of stirring under the last-named conditions, the vacuum was broken by the introduction of nitrogen, the contents of the autoclave were removed in string form through the bottom valve, and were granulated. The reduced viscosity of the resulting powder was determined to be 0.7 measured at 25°C in a capillary viscosimeter. The reduced viscosity was computed according to the following formula:

$$n_{red} = (n - n_o/n_o) \cdot (1/c)$$

wherein $n$ is the viscosity of the solution, $n_o$ is the viscosity of the solvent (60 parts by weight of phenol plus 40 parts 1,1,2,2-tetrachloroethane), and $c$ is the concentration of the solution, 1 g per 100 ml of solvent. The melting point (determined by differential thermoanalysis as the maximum melting temperature) amounted to 200°C.

EXAMPLE 2

Example 1 was repeated, but 12.5 g of talc (0.05%) of a fineness less than 5 microns was also added to the mixture.

EXAMPLE 3

Example 1 was repeated, but 25 g of talc (0.1%) of a fineness less than 5 microns was added to the mixture.

EXAMPLE 4

Example 1 was repeated, but 37.5 g of talc (0.15%) of a fineness under 5 microns was added to the mixture.

EXAMPLE 5

Example 1 was repeated, but 25 g of barium sulfate (0.1%) of a fineness under 5 microns was added to the mixture.

EXAMPLE 6

Example 1 was repeated, but 25 g of calcium sulfate (0.1%) of a fineness under 5 microns was added to the mixture.

EXAMPLE 7

Example 1 was repeated, but 25 g of silica gel (0.1%) of a fineness under 5 microns was added to the mixture.

EXAMPLE 8

13.6 kg of dimethyl terephthalate,
2.5 kg of 1,6-hexanediol and
9.5 kg of ethylene glycol were re-esterified under nitrogen in the presence of 3.4 g of zinc acetate dihydrate at temperatures of 180° to 220°C until the evolution of methanol had ended; then 6.8 g of triphenyl phosphite, 4.1 g of antimony trioxide and 14 g of talc were added and the temperature was increased to 255°C. Beginning at this time a vacuum was applied and at the same time the temperature was raised to 270°C. After the pressure in the reactor had reached 1 Torr at 270°C internal temperature, the mixture was stirred for another 1.5 hours, and then the product was taken out in the form of a strand and granulated. The reduced viscosity of the resulting powder was measured at 0.67. The maximum melting temperature (determined by differential thermoanalysis) amounted to 203°C.

EXAMPLE 9

Example 8 was repeated, but instead of 14 g of talc, 14 g of finely powdered barium sulfate was added to the mixture.

EXAMPLE 10

Example 8 was repeated, but instead of 14 g of talc, 14 g of finely powdered calcium carbonate was added to the mixture.

EXAMPLE 11

Example 8 was repeated, but instead of 14 g of talc, 14 g of finely powdered silica gel was added to the mixture.

The melting adhesives prepared according to Examples 1 to 11 were fused in a melting pot at 230°C in a gluing machine and delivered through a pump system to two leather surfaces to be joined together. The machine used is described in "Schuhtechnik," 61, No. 3, p. 283. The time was measured from the application of the fused adhesive to the solid bonding of the cemented leather surfaces, this being taken as the setting time. When the pieces were pulled apart, a tear was found in the leather every time, not in the adhesive. This proves that the addition of the mineral powders has no adverse effect on the strength of the adhesive bond. The results are listed in the following table.

| Melting adhesive per Example No. | Setting time in seconds |
| --- | --- |
| 1 | 6.5 |
| 2 | 4.0 |
| 3 | 2.0 |
| 4 | 2.0 |
| 5 | 2.5 |
| 6 | 3.0 |
| 7 | 2.0 |

-Continued

| Melting adhesive per Example No. | Setting time in seconds |
| --- | --- |
| 8 | 2.0 |
| 9 | 2.5 |
| 10 | 2.5 |
| 11 | 2.0 |

It can be seen from the table that an optimum setting time is achieved with the addition of about 0.1% mineral powder. There are no important differences in the setting times for co-polyesters containing talc, barium sulfate, calcium sulfate or silica gel in the same amount. The behavior of the copolyesters of Examples 1–7, which chemically have the same composition of terephthalic acid, isophthalic acid and 1,4-butanediol, does not differ from that of the co-polyesters from Examples 8–11 which have the same chemical composition of terephthalic acid, on the other hand, and a mixture of ethylene glycol and 1,6-hexanediol on the other.

EXAMPLES 12–17

9.7 kg of dimethyl terephthalate, 2.3 kg of butanediol-1,4 and 6.1 kg of ethylene glycol were re-esterified in the presence of 2.4 g of zinc acetate dihydrate and 2.8 g of antimony trioxide over a period of 3 hours at temperatures of 180° to 220°C. After methanol had ceased to be evolved, the temperature was raised to 250°C, a vacuum was applied, and the mixture was polymerized for 4 hours at 250° to 270°C and a final pressure of 0.2 Torr. The slightly gray-green end product had a reduced viscosity of 0.74 and a melting point of 210°C.

The setting time of this product in the cementing of leather to leather was determined to be 8 seconds.

Then the following quantities of the inorganic fillers named below were uniformly stirred into the melted pure polyester, and the following setting times were found:

| | |
| --- | --- |
| a) 0.05% talc: | Setting time 5.0 sec. |
| b) 0.1% talc: | Setting time 2.0 sec. |
| c) 0.2% talc: | Setting time 2.0 sec. |
| d) 0.1% silica gel: | Setting time 2.5 sec. |
| e) 0.1% silica gel: | Setting time 7.0 sec. |

In Experiment e the average particle diameter of the inorganic powder amounted to about 20 $\mu$, and in Experiments a to d it amounted to 5 $\mu$ and less.

What is claimed is:

1. In the gluing of at least two objects together with a melting adhesive which is a polyester by melting a polyester polymer adhesive, juxtaposing such melted adhesive to at least two solid materials to be glued together and holding said juxtaposition until said melted adhesive has solidified and bonded said solid materials together; the improvement which comprises using as the polyester a material having a melting point of 180° to 220°C having an acid moiety comprising terephthalic acid and a glycol moiety comprising at least one glycol having 2 to 10 carbon atoms, and which improvement furthermore comprises admixing said melted polyester with about 0.01 to 0.1 weight percent of at least one non-coloring, inert, inorganic powder having a grain size of less than 5 microns.

2. The improved process claimed in claim 1 wherein 0.05 to 0.1 weight percent of powder is used.

3. The improved process claimed in claim 2 wherein said acid moiety includes isophthalic acid.

4. The improved process claimed in claim 3, wherein said acid moiety consists essentially of said acids in a mole ratio of 70:30 to 90:10 terephthalic to isophthalic.

5. The improved process claimed in claim 2 wherein said powder is at least one member selected from the group consisting of silica, zirconium oxide, aluminum oxide, talc, gypsum, fluorspar, kaolin, mica, barium sulfate, calcium carbonate and bentonite.

6. The improved process claimed in claim 1 wherein said objects are leather.

7. The improved process claimed in claim 2 wherein said powder is titanium dioxide.

8. The improved process according to claim 2 wherein the polyester has a reduced viscosity of 0.7 measured at 25°C in a capillary viscosimeter employing 60 parts by weight of phenol plus 40 parts of 1,1,2,2-tetrachloroethane as the solvent, said reduced viscosity being computed according to the following formula:

$$n_{red} = (n - n_o/n_o) \cdot (1/c)$$

wherein $n$ is the viscosity of the solution, $n_o$ is the viscosity of the solvent, $c$ is the concentration of the solution at 1 gram per 100 mm of solvent.

\* \* \* \* \*